(12) United States Patent
Cuijpers et al.

(10) Patent No.: US 6,614,455 B1
(45) Date of Patent: Sep. 2, 2003

(54) DIRECTIONAL NAVIGATION WITHIN A GRAPHICAL USER INTERFACE

(75) Inventors: Maurice Johannes Cuijpers, Campbell, CA (US); Jan Van Ee, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/426,518

(22) Filed: Oct. 26, 1999

Related U.S. Application Data
(60) Provisional application No. 60/156,468, filed on Sep. 27, 1999.

(51) Int. Cl.[7] ................................................ G09G 5/00
(52) U.S. Cl. ...................... 345/810; 345/802; 345/817
(58) Field of Search ................................ 345/810, 812, 345/813, 817, 818, 829, 840, 854, 857, 858, 862, 802

(56) References Cited

U.S. PATENT DOCUMENTS

| | | | |
|---|---|---|---|
| 4,803,474 A | 2/1989 | Kulp | 345/160 |
| 5,367,316 A * | 11/1994 | Ikezaki | 345/158 |
| 5,510,811 A * | 4/1996 | Tobey et al. | 345/157 |
| 5,517,257 A | 5/1996 | Dunn et al. | 348/734 |
| 5,596,347 A * | 1/1997 | Robertson et al. | 345/856 |
| 5,808,604 A * | 9/1998 | Robin | 345/862 |
| 5,910,798 A * | 6/1999 | Kim | 345/163 |
| 6,088,031 A * | 7/2000 | Lee et al. | 345/810 |
| 6,317,144 B1 * | 11/2001 | Pabla et al. | 345/854 |

FOREIGN PATENT DOCUMENTS

| | | | |
|---|---|---|---|
| EP | 0671682 A2 | 9/1995 | |
| EP | 0725538 A2 | 8/1996 | |
| EP | 1006428 A2 | 6/2000 | |
| WO | 9843381 | 10/1998 | |
| WO | 9917549 | 4/1999 | H04N/7/173 |

\* cited by examiner

Primary Examiner—John Cabeca
Assistant Examiner—Tadesse Hailu
(74) Attorney, Agent, or Firm—Jeroen Heuvelman

(57) ABSTRACT

In a graphical user interface, preferably for use with a television and set top box, menu navigation is achieved through use of a directional input. From the directional input and a current position, a fitness measure is derived for each menu option. From the fitness measure, a processing device guesses a target menu location. The directional input typically will come from a remote with buttons indicating directions, including diagonal directions.

7 Claims, 3 Drawing Sheets

$$((x,y), (x_p,y_p), (a,b)) = \begin{cases} \dfrac{((x_p,-x)*a + (y_p,-y)*b)^2}{((x_p,-x)^2 + (y_p,-y^2)^d)*(a^2 + b^2)} & \text{if}((x_p - x)*a + (y_p - y)*b) > 0 \\ -1 & \text{OTHERWISE} \end{cases}$$

WHERE

≫ $(x,y)$ IS A CURRENTLY HIGHLIGHTED POINT,

≫ $(x_p, y_p)$ IS THE LOCATION OF A POINT p,

≫ p IS IN THE RANGE [0,m),

≫ m IS IN THE NUMBER OF "REACHABLE" POINTS,

≫ $(a,b)$ IS A VECTOR INDICATING A DIRECTION A USER WISHES TO JUMP, d IS A VALUE FROM [1,→) THAT DETERMINES AN INFLUENCE OF DISTANCE $(x,y)$ TO $(x_p,y_p)$ IN THE VALUE OF FITNESS

FIG. 4

DIRECTIONAL NAVIGATION WITHIN A GRAPHICAL USER INTERFACE

RELATED APPLICATIONS

This application claims the benefit of provisional application Ser. No. 60/156,468 filed Sep. 27, 1999.

The following related applications are incorporated herein by reference:

U.S. patent application Ser. No. 09/160,490 filed Sep. 25, 1998 by Adrian Turner et al, entitled "Customized Upgrading of Internet Devices Based on User Profile"; and U.S. patent application Ser. No. 09/189,535, filed Nov. 10, 1998 by Yevgeniy Shteyn, entitled "Upgrading of Synergistic Aspects of Home Networks."

BACKGROUND OF THE INVENTION

1. Field of the Invention

The invention relates to the field of graphical user interfaces (GUI) and in particular to directional navigation within such interfaces.

2. Related Art

Particularly in the field of set top boxes for television-based Internet access, such as Internet TV, directional navigation within GUI's has been problematic. The menus for such systems are sometimes displayed as boxes or positions to select on the television screen. Typically, the user is navigating with a remote rather than a mouse or track ball. Typically the remote has rather primitive directional capabilities, such as buttons with arrows indicating up, down, right, and left, please see e.g. PCT application WO 98/43381, FIG. 3. Sometimes the interpretation of these arrows by the set top box is buggy, with a directional command giving the user some direction other than what the user expected.

SUMMARY OF THE INVENTION

It is an object of the invention to make directional navigation within a GUI more flexible and accurate.

The invention provides use of a data processing method or apparatus which receives a user input specifying a vector; determines a fitness of a plurality of menu options based on a current position, the vector, and the Plurality of menu options; and supplies a target menu option based on the fitness.

BRIEF DESCRIPTION OF THE DRAWING

The invention will now be described, by way of non-limiting example, with reference to the following figure(s).

FIG. 4 shows an equation

DETAILED DESCRIPTION OF THE PREFERRED EMBODIMENTS

Figure 1:
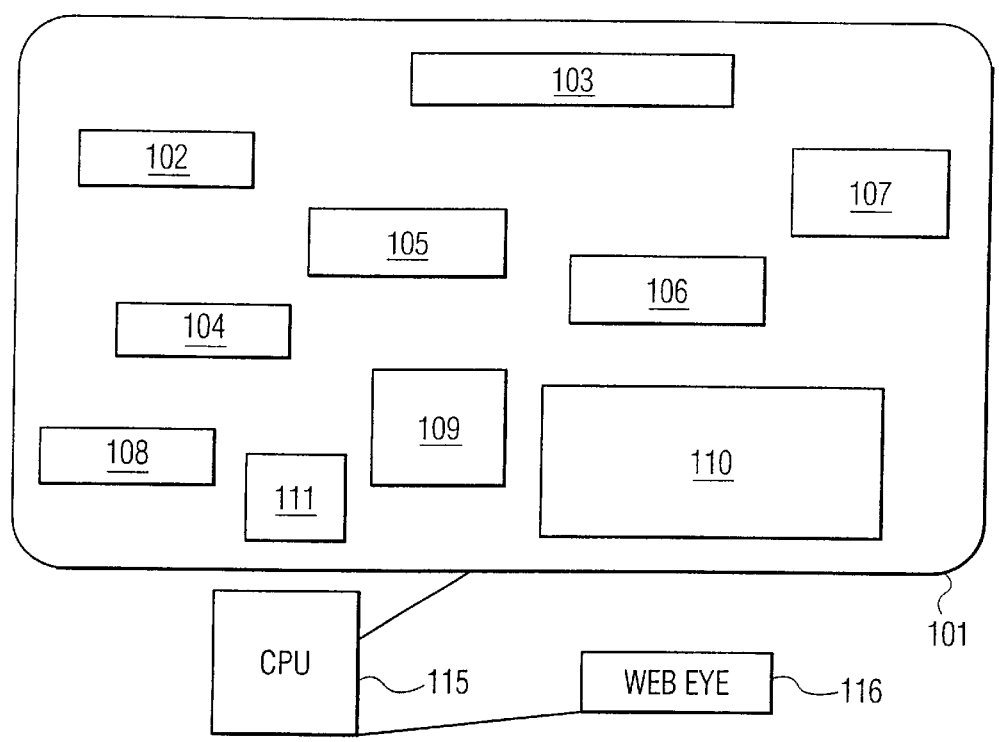
FIG. 1 shows a data processing system for use with the invention.

FIG. 1 shows a schematic of a menu for use in a television based Internet access interface. A television screen 101 displays a plurality of menu items 102–111. Each menu item is associated with a multipixel region or target area on the display. The menu items may be arranged in a regular table, or they may have an irregular arrangement. The menu items are typically displayed as boxes, positions, or fields on the screen. The boxes may all have the same size, or they may have different sizes depending on the needs of the application. The television screen is connected with a processor 115, which may be asset top box, or an internal processor. The processor is coupled with a device 116 for receiving input from a remote. The device 116 may be a remote IR (infrared) sensor.

FIG. 1 is only illustrative of one type of data processing system which might make use of the concepts of the invention. Other types of data processing systems such as PCs with various types of displays might also use the concepts of the invention; however, generally these systems will be without a continuous type of position selection apparatus, such as a mouse, and instead have rather limited directional input apparatus, such as cursor keys.

Figure 2:
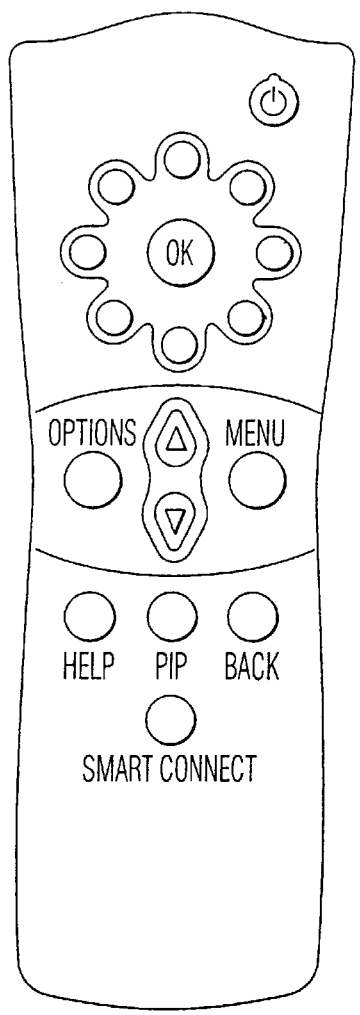
FIG. 2 shows a remote control device for use with the invention.

FIG. 2 shows a remote for use with the interface of FIG. 1. The remote has a number of buttons for function specification. The buttons include SmartConnect™ 201, help 204, picture in-picture (PIP) 203, back 202, menu 261, options 206, and power 212. In addition, there are conventional up and down buttons 207 and 208 for channel and volume control. Navigation is achieved at 209, with a nine button arrangement. Buttons 211.1–211.8 represent motion vectors according to the following table:

| Button reference # | Specified motion vector |
| --- | --- |
| 211.8 | (0,1) |
| 211.7 | (1,1) |
| 211.6 | (1,0) |
| 211.5 | (1,−1) |
| 211.4 | (0,−1) |
| 211.3 | (−1,−1) |
| 211.2 | (−1,0) |
| 211.1 | (−1,1) |

For the purpose of this application, the term "vector" can refer to 1) an ordered n-tuple of numbers; 2) a specification of length and direction; or 3) merely, a direction, according to the needs of the particular application. The term "directional input" is used analogously with vector. In response to a motion vector specification by the user, the-GUI will highlight or otherwise indicate one of the menu options on FIG. 1. Button 210 is an "OK" button, which allows a user to select an item that is indicated on the screen.

Figure 3:
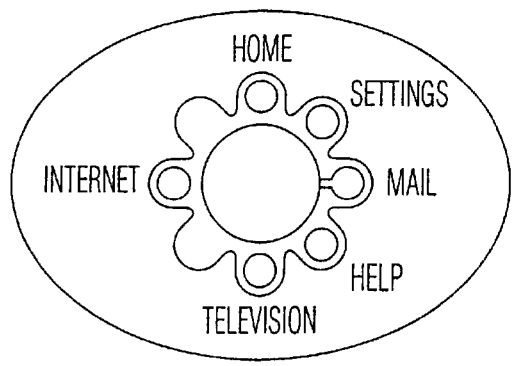
FIG. 3 shows a menu.

The remote of FIG. 2 might be used with a menu where the options were displayed like petals of an eight petal flower, where each button would specify a petal, per FIG. 3. In FIG. 3, the petals correspond to options as follows: 301 is home; 302 is settings; 303 is mail; 304 is help; 305 is television, and 306 is Internet. Those of ordinary skill in the art can devise other options to correspond to the petals, or flowers and remotes with more or less petals. The correspondence between the buttons and the petals might then be hardwired into the display.

Those of ordinary skill in the art might design other remotes for specifying motion within the menu of FIG. 1. Most commonly, the remote will take directional inputs from buttons, keys, disks or other touch sensitive actuators. The remote might also have some pressure sensitivity so that if the button were pushed harder it would indicate a greater length of vector.

With an irregular distribution of menu options, as shown in FIG. 1, the question becomes which menu option to indicate in response to a given vector specification. According to the invention, a data processor must "guess" which menu option to highlight in response to the vector.

According to one embodiment, when the user inputs a direction, given the current element and the set of destination elements, a fitness value is calculated for every destination element; the destination element with the best fitness value is made the new current element. The fitness value of a given destination element is calculated as follows. A negative fitness value will discard the destination element as a possible destination:

1) If the direction is straight up or straight down:
   a) if there is sufficient horizontal overlap between current and destination element, the fitness value is the square of the vertical distance;
   b) if there is insufficient horizontal overlap between current and destination element, the fitness value is negative
2) if the direction is straight left or straight right:
   a) if there is sufficient vertical overlap between current and destination element, the fitness value is the square of the horizontal distance
   b) if there is insufficient vertical overlap between current and destination element, the fitness value is negative
3) if the direction is diagonal:
   a) if there is sufficient horizontal and vertical overlap between current and destination element, the fitness value is the square of the vertical distance plus the square of the horizontal distance
   b) if there is insufficient horizontal or vertical overlap between current and destination element, the fitness value is negative According to this embodiment, the best fitness value is the smallest non-negative fitness value. Those of ordinary skill in the art might devise other ways of determining fitness.

In the procedure listed above, insufficient overlap may be defined as follows, though those of ordinary skill in the art might well devise other methods. In the following, pseudo-code for defining sufficiency or insufficiency of overlap appears in a different type face. The notation "B.right" means the right border of element B"A.left" means the left border of element A; and so forth.

1) sufficiency of horizontal overlap for straight up or straight down navigation between a current element A and a destination element B is defined as:

```
overlap = sufficient;
if (B.right > A.right)
{
    if ((B.right - A.right > A.right - B.left) and
        (B.left - A.left > A.right - B.left))
        overlap = insufficient;
}
if (B.left < A.left)
{
    if ((A.left - B.left > B.right - A.left) and
        (A.right - B.right > B.right - A.left))
        overlap = insufficient;
}
```

In other words, overlap will be considered sufficient unless
i)
   a) the right border of B is farther right than the right border of A, and
   b) the difference between the positions of the right borders of A and B is greater than the difference between the positions of the right border of A and the left border of B, and
   c) the difference between the positions of the left borders of A and B is greater than the difference between the positions of the right border of A and the left border of B; OR
ii)
   a) the left border of B is further left than the left border of A, and.
   b) the difference in positions of the left borders of A and B is greater than the difference in positions of the right border of B and the left border of A, and
   C) the difference in positions of the right borders of A and B is greater than the difference in positions of the right border of B and the left border of A.
2) sufficiency of vertical overlap for straight right or straight left navigation between a current element A and a destination element B is defined as:

```
overlap = sufficient;
if (B.bottom > A.bottom)
{
    if ((B.bottom - A.bottom > A.bottom - B.top) and
        (B.top - A.top > A.bottom - B.top))
        overlap = insufficient;
}
if (B.top < A.top)
{
    if ((A.top - B.top > B.bottom - A.top) and
        (A.bottom - B.bottom > B.bottom - A.top))
        overlap = insufficient;
}
```

In other words, overlap is sufficient unless
i)
   a) the bottom border of B is higher than the bottom border of A, and
   b) the difference in positions of the bottom borders of B and A is greater than the difference in positions between the bottom border of A and the top border of B, and
   c) the difference in positions of the top borders of A and B is greater than the difference in position between the bottom border of A and the top border of B, OR
ii)
   a) the top border of B is lower than the top border of A, and
   b) the difference in position between the top borders of A and B is greater than the difference in position between the bottom border of B and the top border of A, and
   c) the difference in position between the bottom borders of A and B is greater than the difference in position between the bottom border of B and the top border of A.
3) for diagonal navigation the overlap between a current element A and a destination element B is insufficient if B does not extent least half way vertically and horizontally into the quadrant defined by the direction of the diagonal navigation:
   the quadrant to the top right of A for a top right navigation
   the quadrant to the top left of A for a top left navigation
   the quadrant to the bottom right of A for a bottom right navigation
   the quadrant to the bottom left of A for a bottom left navigation Thus the term "sufficient overlap" does not mean that two menu option regions actually overlap, but rather that they fit within a overlap definition, such as that above.

Those of ordinary skill in the art may devise other ways of "guessing" which menu option is possible. For instance, a fitness value $((x,y),(x_p,y_p),(a,b))$ may be determined in accordance with the equation of FIG. 4, where the screen elements representing menu positions are relatively small in proportion to the size of the screen. Again the fitness is used to determine an optimal target location. If two target locations have the same fitness value, one must be chosen.

Another way of expressing the equation of FIG. 4 is to say that fitness $((x,y),(x_p,y_p),(a,b))$ equals the square of the cosine between vectors $(x_p-x,y_p-y)$ and $(a,b)$ divided by some power of. the length of vector $(x_p-x,y_p-y)$. Alternatively, if $(a,b)$ is normalized to length 1, the length of $(a,b)$ can be removed from the fitness function. It may also be beneficial to raise the cosine to some-other power than 2.

In the foregoing, two types of fitness measures have been considered. Those of ordinary skill in the art might conceive of others. Typically, a fitness measure should consider factors such as the direction and distance between a candidate target position and a current position. The use of the cosine, or inner product, in a formula like that of FIG. 4, is a way of taking into account the similarity or difference in direction between $(a,b)$ and $(x_p-x,y_p-y)$.

In addition, the size of the region occupied by a menu option might be considered. This size becomes a more significant factor if the region becomes larger. Thus, if the direction specified by the user points at only a tiny corner of the region, then possibly the entire region is not a very fit target position, and a more distant one might be more appropriate. One might want to consider how closely the directional input points to a center of gravity of the region. One could consider the fitness of all points within the region and perform some sort of integration in order to determine the fitness of the entire region. The first specified fitness measurement, above, uses region boundaries as away of taking into account the regional extent of the menu option without performing such an integration.

> One system in which the invention may be used is the Philips Pronto. More systems and remotes where the invention maybe used are described in the following US patent applications which are incorporated herein by reference:
>
> U.S. Ser. No. 09/062,364 (Attorney docket PHA 23,387) filed Apr. 17, 1998 for Jan van Ee and Sung Choi for GRAPHICAL USER INTERFACE TOUCH SCREEN WITH AUTO ZOOM FEATURE. Now U.S. Pat. No. 6,211,856.
>
> U.S. Ser. No. 09/128,839 (Attorney docket PHA 23,469) filed Aug. 4, 1998 for Jan van Ee for REMOTE CONTROL HAS ANIMATED GUI.
>
> U.S. Ser. No. 09/129,300 (Attorney docket PHA 23,470) filed Aug. 5, 1998 for Jan van Ee for GUI OF REMOTE CONTROL FACILITATES USER FRIENDLY EDITING OF MACROS. U.S. Pat. No. 6,208,341.
>
> U.S. Ser. No. 09/271,200 (attorney docket PHA 23,607) filed Mar. 17, 1999 for Jan van Ee for FULLY FUNCTIONAL REMOTE CONTROL EDITOR AND EMULATOR.
>
> U.S. Ser. No. 09/311,128 (attorney docket PHA 23,501) filed May. 13, 1999 for Joost Kemink for INTERNET-BASED SERVICE FOR UPDATING A PROGRAMMABLE CONTROL DEVICE From reading the present disclosure, other modifications will be apparent to persons skilled in the art. Such modifications may involve other features which are already known in the design, manufacture and use of graphical user interfaces and remote controls for use with display screen devices, which modifications may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all is of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

What is claimed is:

1. A data processing system, comprising:
    a) a display device;
    b) a graphical user Interface including a plurality of menu options associated with positions on the display device; and
    c) a processor adapted to perform the following operations
        i) receiving a user input specifying a vector selected by the user from a finite selection of user-selectable vectors, the user selecting the vector based on a current position,
        ii) determining a respective fitness for each of the plurality of menu options based on the current position, the vector, and the plurality of menu options, and
        iii) supplying a target menu option, which Is that one having a most optimal fitness,
            wherein the fitnesses are determined according to a procedure that takes into account a difference in direction between the vector and the difference between the current position and a given one of the plurality of menu options,
    wherein the steps of determining a respective fitness and supplying a target menu option comprises:
        determining a fitness of each of the plurality of menu options according to the following criteria:
            i) If the direction is straight up or straight down:
                A) if there is sufficient horizontal overlap between current and destination element the fitness value is the square of the vertical distance; and
                B) if there is insufficient horizontal overlap between current and destination element, the fitness value is negative;
            ii) if the direction is straight left or straight right:
                A) if there is sufficient vertical overlap between current and destination element, the fitness value is the square of the horizontal distance; and
                B) if there is insufficient vertical overlap between current and destination element, the fitness value is negative; and
            iii) if the direction is diagonal:
                A) if there is sufficient horizontal and vertical overlap between current and destination element, the fitness value is the square of the vertical distance plus the square of the horizontal distance; and B) if there is insufficient horizontal or vertical overlap between current and destination element, the fitness value is negative; and supplying the target menu option as that one having a most optimal fitness.

2. The system of claim 1, wherein
I) sufficiency of horizontal overlap for straight up or straight down navigation between a current element A and a destination element B is defined as:
  i)
   a) the right border of B is farther right than the right border of A, and
   b) the difference between the positions of the right borders of A and B is greater than the difference between the positions of the right border of A and the left border of B, and
   c) the difference between the positions of the left borders of A and B is greater than the difference between the positions of the right border of A and the left border of B; OR
  ii)
   a) the left border of B is further left than the left border of A, and
   b) the difference in positions of the left borders of A and B is greater than the difference in positions of the right border of B and the left border of A, and
   c) the difference in positions of the right borders of A and B is greater than the difference in positions of the right border of B and the left border of A,
II) sufficiency of vertical overlap for straight right or straight left navigation between a current element A and a destination element B is defined as:
  i)
   a) the bottom border of B is higher than the bottom border of A, and
   b) the difference in positions of the bottom borders of B and A is greater than the difference in positions between the bottom border of A and the top border of B, and
   c) the difference in positions of the top borders of A and B is greater than the difference in position between the bottom border of A and the top border of B, OR
  ii)
   a) the top border of B is lower than the top border of A, and
   b) the difference in position between the top borders of A and B is greater than the difference in position between the bottom border of B and the top border of A, and
   c) the difference In position between the bottom borders of A and B is greater than the difference in position between the bottom border of B and the top border of A,
III) for diagonal navigation the overlap between a current element A and a destination element B is insufficient if B does not extent at least half way vertically and horizontally into the quadrant defined by the direction of the diagonal navigation;
  the quadrant to the top right of A for a top right navigation;
  the quadrant to the top left of A for a top left navigation;
  the quadrant to the bottom right of A for a bottom right navigation;
  the quadrant to the bottom left of A for a bottom left navigation.

3. The system of claim 1, wherein fitness is determined according to the following equation:

$$((x,y), (x_p, y_p), (a,b)) = \begin{cases} \dfrac{((x_p - x) * a + (y_p - y) * b)^2}{((x_p - x)^2 + (y_p - y)^2)^d * (a^2 + b^2)} & \text{if } ((x_p - x) * a + (y_p - y) * b) > 0 \\ -1 & \text{otherwise} \end{cases}$$

Where
  (x,y) is a currently highlighted point,
  $(x_p, y_p)$ is the location of a point p,
  p is in the range [0,m),
  m is the number of "reachable" points,
  (a,b) is a vector indicating a direction a user wishes to jump,
  d is a value from $[1, \to)$ that determines an influence of distance (x,y) to $(x_p, y_p)$ in the value of fitness.

4. A data processing system comprising:
  a) a display;
  b) means for receiving a directional input selected by the user from a finite selection of user-selectable directional inputs, the user selecting the directional input based on a current position of a displayed position indicator;
  c) a data processor configured to perform the following operations:
    i) providing a GUI on the display, which GUI includes a menu that Includes a plurality of menu options, each menu option being associated with a respective multipixel target area selectable through controlling position of the displayed position indicator, selection being achieved through one or more discrete jumps from one option to another option, other positions on the GUI not being accessible and the multipixel regions not being randomly accessible;
    ii) receiving, via the means for receiving, the directional input for use with the menu, which directional input specifies a direction other than straight up, straight down, straight left, and straight right; and
    iii) guessing a target menu option from amongst the plurality, based on respective fitnesses of the menu options derived based on the directional input and the current position.

5. The system of claim 4, wherein the display is a television screen, the means for receiving is an IR remote sensor, and the processor is disposed within a set top box.

6. The system of claim 4, wherein the means for receiving comprises at least one touch sensitive actuator for receiving the directional input from the user.

7. The system of claim 4, wherein the touch sensitive actuator is a button.

* * * * *